Jan. 13, 1948.     J. J. DELANY ET AL     2,434,262
REMOVABLE VALVE SEAT AND SLEEVE
Filed July 27, 1944
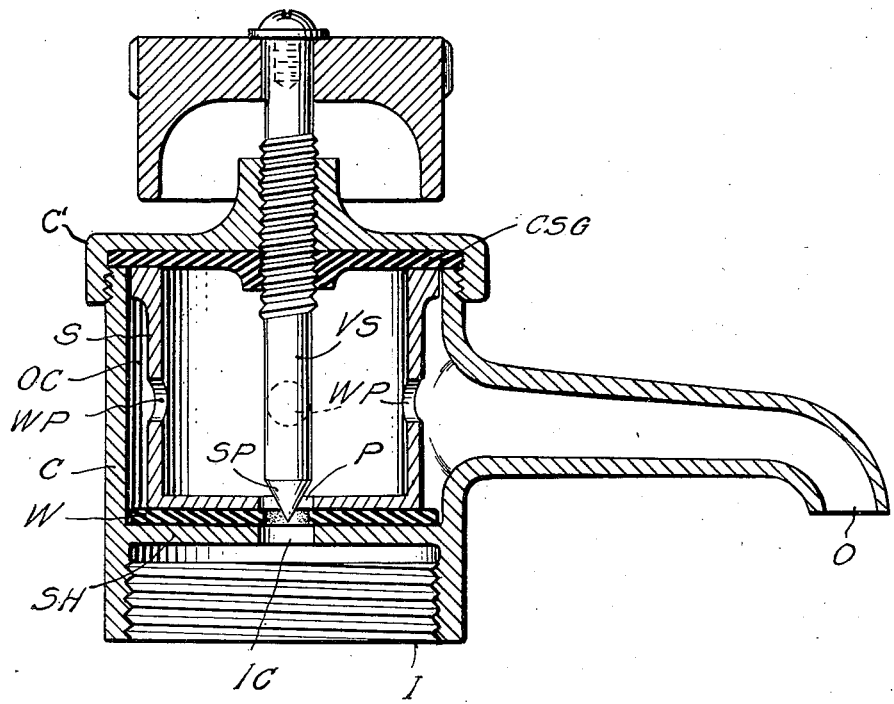
Inventors
John J Delany
Jesse D. Langdon Patented Jan. 13, 1948

2,434,262

UNITED STATES PATENT OFFICE 2,434,262

REMOVABLE VALVE SEAT AND SLEEVE

John J. Delany, Brooklyn, N. Y., and Jesse D. Langdon, Long Beach, Calif.

Application July 27, 1944, Serial No. 546,874

1 Claim. (Cl. 251—156)

The present invention relates to fluid control valves, and has for its primary purpose the provision of a removable sleeve for retaining a flexible or cushioned valve seat acting to seal off and separate an inlet chamber and outlet chamber with a gasket adapted to act as a valve seat. Other and further objects will appear as the specification proceeds, as illustrated by the drawing, which is for the purpose of illustration only and shows reduction to practice which may be changed within the scope of what is claimed.

Of the drawing:

The figure of the drawing is a sectional view showing the structure of the valved portion of a valve embodying the invention.

The invention consists of a sleeve S inserted into casing C between the inlet I and the outlet O and impinging the circumferential faces of washer W between the lower end of the sleeve S and shoulder SH provided adjacent the inlet chamber IC, thus sealing off the inlet chamber IC from the outlet chamber OC which is formed around the outside of sleeve S and washer W are ported at P to permit the flow of fluid from the inlet chamber IC to outlet chamber OC when the valve port P is open, wall port WP communicates with chamber OC. The port in washer W is formed with a diameter slightly smaller than the diameter of the adjacent openings in sleeve S and shoulder SH to provide a seating surface for seating portion SP of valve stem VS.

The valve stem VS having the seating portion SP registering with the port P is threadedly inserted in the cap C' and surrounded by cap and sleeve gasket CSG which seals both the cap C' and the upper end of the sleeve S against leakage as well as acting as a packer for the stem VS.

When the valve is operated, the seating portion SP is raised from port P and permits the flow of fluid from chamber IC thru sleeve S and ports WP into chamber OC.

It will be noted that port P and inlet chamber IC in shoulder SH are formed with diameters only slightly larger than the diameter of the port in washer W to prevent fluttering or chattering between the seating portion SP and washer W when fluid is flowing through the valve.

Having described the invention and what is new, we claim:

A valve comprising a casing closed at one end and open at the other end, the closed end having a port to provide an inlet and a shoulder around said inlet, an outlet in the side wall of said casing, a rigid sleeve closed at one end and open at the other end, said sleeve being mounted in said casing and having a port in its closed end adjacent to and coaxial with the port in said casing and having its side wall perforated to provide communication between said inlet and said outlet, a removable valve seat member of comparatively soft flexible material having a port of smaller diameter than the ports of said casing and said sleeve and coaxial therewith, said valve seat member being secured between the closed end of said sleeve and said shoulder, a diaphragm extending across the open end of said casing, a cap mounted over the open end of said casing outside of said sleeve and serving to clamp the periphery of said diaphragm to said casing to prevent leakage between said casing and said cap, a valve stem threadedly disposed thru said cap and said diaphragm, a valve seat-engaging portion formed on the inner end of said stem to seat on the wall of the port in said valve seat member, that portion of the valve seat member projecting radially inwardly of the walls of the ports thru said casing and said sleeve being free to flex against the valve seat-engaging portion of said stem under the influence of fluid pressure, and that portion of said valve seat member between said casing and said sleeve serving as a gasket to prevent leakage between said casing and said sleeve.

JOHN J. DELANY.
JESSE D. LANGDON.

REFERENCES CITED

The following references are of record in the file of this patent:

UNITED STATES PATENTS

| Number | Name | Date |
|---|---|---|
| 925,679 | Bonfield | June 22, 1909 |
| 1,988,966 | Eckhouse | Jan. 22, 1935 |
| 1,853,246 | Watrous | Apr. 12, 1932 |
| 1,980,752 | Eskilson | Nov. 13, 1934 |
| 590,240 | Savill | Sept. 21, 1897 |

FOREIGN PATENTS

| Number | Country | Date |
|---|---|---|
| 356,373 | Great Britain | 1931 |